Oct. 13, 1970  J. VARGA  3,533,143
METHOD OF AND DEVICE FOR FIRING AXIALLY
SYMMETRIC CERAMIC OBJECTS
Filed Jan. 12, 1966  3 Sheets-Sheet 1

INVENTOR.
Josef Varga
BY
Richard Grob
Ag't

United States Patent Office 3,533,143
Patented Oct. 13, 1970

3,533,143
METHOD OF AND DEVICE FOR FIRING AXIALLY SYMMETRIC CERAMIC OBJECTS
Josef Varga, Hradec Kralove, Czechoslovakia, assignor to Tesla, narodni podnik, Prague, Czechoslovakia
Filed Jan. 12, 1966, Ser. No. 520,124
Claims priority, application Czechoslovakia, Jan. 13, 1965, 239/65; Apr. 28, 1965, 2,770/65
Int. Cl. F27b 9/00
U.S. Cl. 25—142                                4 Claims

ABSTRACT OF THE DISCLOSURE

Apparatus for firing ceramic objects comprising a longitudinally extending oven having a firing space and an inlet and outlet. A movable carrier is mounted along the medial axis of the oven and directly supports the objects to be fired. Means are provided to rotate the carrier and the object about the medial axis, and to simultaneously move the object from outlet to inlet.

---

The invention relates to apparatus for, firing axially symmetrical ceramic objects, for example rods, tubes, and the like.

For firing, such objects have hitherto been generally suspended perpendicularly, or placed horizontally, in the firing space of a kiln. Horizontally placed objects are supported or placed on a suitable base and sometimes covered by small pieces of fired ceramic material.

Firing ceramic material of longer dimensions by the known methods meets with difficulties because the objects become irregularly heated and deformed. Sometimes they also crack. Firing of longer objects also requires ovens of large dimensions which are costly to build and are uneconomical in operation.

It has, therefore, also been proposed to fire long objects in small ovens with a firing region much smaller than the length of the objects undergoing firing. The fired objects and the oven perform a relative movement with respect to each other in the direction of the longitudinal axis. But even this method is not completely satisfactory. The objects undergoing firing become deformed and their maximum length is limited to 1 m.

It has already been proposed to fire such objects by passing them through an oven which is open at one end, with their longitudinal axis oriented in the direction of the length of the oven. While passing through the oven, the objects rotate about their longitudinal axis. It should be obvious that for firing longer rods in such an oven, the latter would have to be very large and spacious. Heating of large ovens consumes a great amount of energy and is, therefore, uneconomical.

It is, therefore, a general object of the invention to eliminate the above drawbacks and to provide apparatus for the successful firing of axially symmetric ceramic objects of a length even exceeding 1 m.

SUMMARY OF INVENTION

According to the present invention apparatus for firing ceramic objects is provided comprising a longitudinally extending oven having a firing space and an inlet and outlet. A movable carrier is mounted along the medial axis of the oven and directly supports the objects to be fired. Means are provided to rotate the carrier and the object about the medial axis, and to simultaneously move the object from outlet to inlet.

The axis of rotation may, therefore, either coincide with, or be parallel to, the longitudinal axis of the objects undergoing firing.

The rotary movement may be continuous in one direction, or irregular. The objects undergoing firing in open setting may be in direct contact with the source of the rotary movement, or the saggering method may be used and the objects kept in a sagger which is in contact with this source.

In the case of longer objects, the objects undergoing firing are also moved in the direction of its longitudinal axis under the effect of a pull or pressure force. If the objects undergoing firing are rotational about their longitudinal axis, or if they are provided with at least one rotational cavity about their longitudinal axis, the objects undergoing firing may also be conveniently acted upon by a torsional force whose tangential components are in a plane parallel with the axis of rotation. In the case of firing longer bodies with a small diameter and cavities, more particularly tubes, it is convenient to combine for example pull and twist, or pressure and twist.

When firing long objects it is also possible to used small ovens with a firing region much shorter than the length of the object undergoing firing. In this case, of course, the oven and the objects undergoing firing perform a mutually relative axial movement in the direction of the longitudinal axis of the objects undergoing firing.

The rate of the relative rotational movement, or also of the relative axial movement between the oven and the objects to be fired depends on the firing conditions, for example the temperature in the oven and the chemical composition of the objects undergoing firing, and on its dimensions. The mentioned rate of movement must therefore be specially determined in advance for each case. If also a longitudinal relative shift of the objects undergoing firing is used, their speed is adapted to the percentage of their shrinkage.

The invention secures uniform heating which gives higher homogeneity, and thus also a higher mechanical and electrical strength of the body.

The apparatus for carrying out the invention comprises an oven of the feed-through type, and a carrier device upon which the objects to be fired are freely placed, and it is characterized by the fact that at least at one end of the oven there is arranged a device for producing rotation of the objects to be fired.

The objects to be fired may be placed either directly on the carrier or in a suitable sagger and may be automatically rotated or rotated by hand.

In some cases it is convenient if the device permits also a shifting movement of the objects to be fired together with their rotary movement. In such a case the objects to be fired are placed on a carrier device which performs a shifting movement together with the rotational movement. Such a carrier device may for example be a screw placed in a nut carrying on one side a supporting base. The screw is further connected with a device for producing a rotary movement. In such a case it is of course more convenient to arrange both the objects to be fired and the oven perpendicularly.

When firing hollow rotational objects, it is sometimes convenient to arrange the objects to be fired on a core which may be provided with a heating element.

The device in accordance with the invention will be best understood from the following specification to be read in conjunction with the accompanying drawings illustrating preferred examples of embodying the invention.

Figure 1:
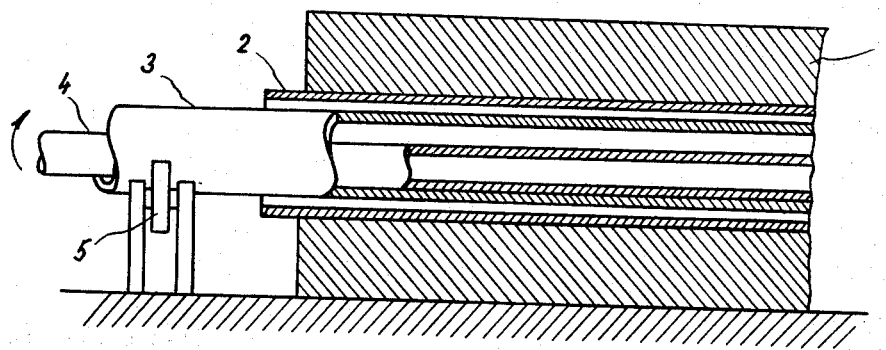
FIG. 1 shows a section through an oven with a sagger having one loading space.

Referring now more particularly to FIG. 1, which shows a section through part of an oven, it should be understood that 1 designates the thermal insulation of the oven, 2 is a heating element, 3 is a sagger or carrier, 4 is an object which undergoes firing, and 5 is a freely rotatable roller cooperating with a device for producing the rotary movement of the object undergoing firing. There may of course be more than one roller 5.

Figure 2:
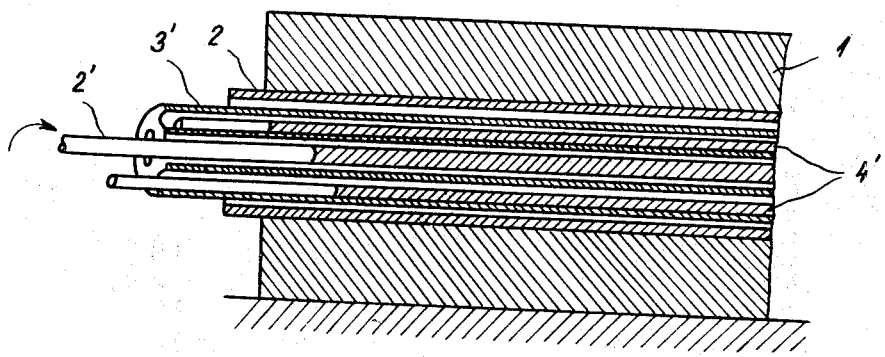
FIG. 2 shows a similar oven but the sagger comprises several loading spaces.

FIG. 2 shows a similar case with the difference that the carrier sagger 3' contains several loading compartments for simultaneous firing of several objects 4'. Another heating element 2' passes through the centre of the sagger. The other reference marks 1 and 2 designate the same items as in FIG. 1.

Figure 3:
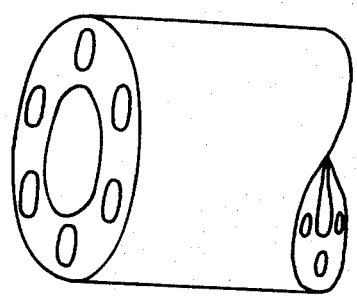
FIG. 3 shows in more detail a sagger with several loading spaces.

FIG. 3 shows in more detail a sagger provided with six loading compartments for joint firing of six short objects.

Figure 4:
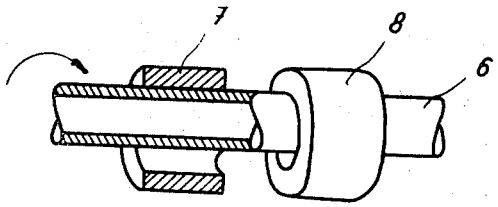
FIG. 4 shows a sagger of another type.

FIG. 4 illustrates a case in which the holder 6 of the objects to be fired is formed by a rod or tube and the objects 7 and 8 to be fired are slipped over the holder.

Figure 5:
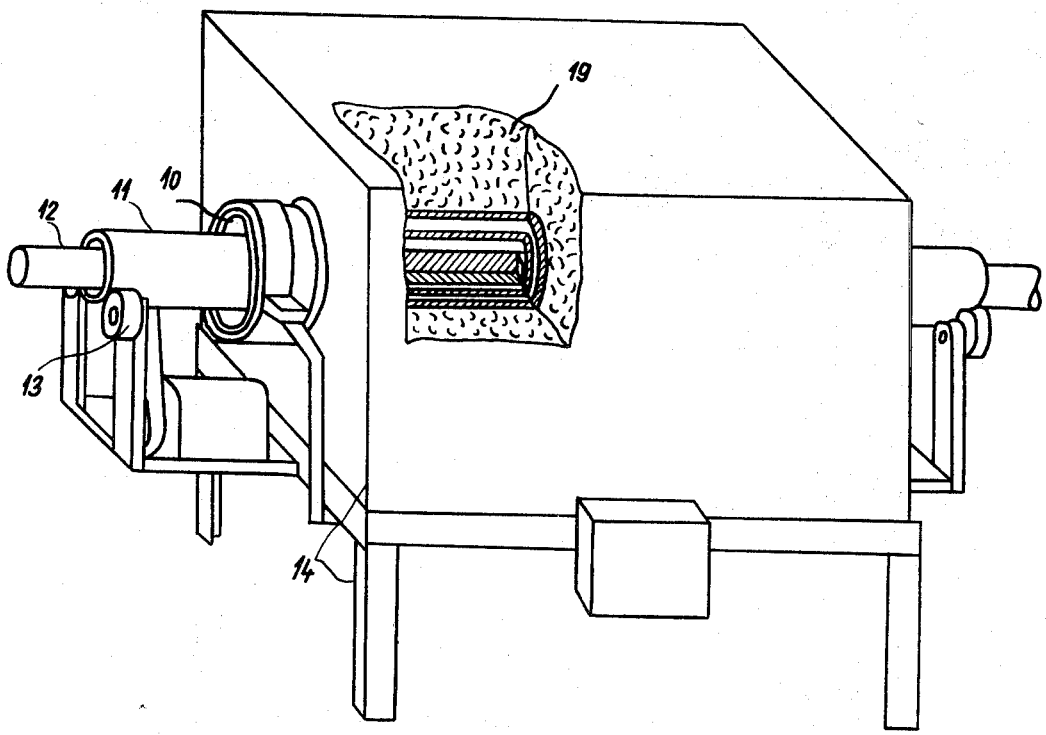
FIG. 5 shows another embodiment of the invention.

FIG. 5 illustrates in more detail another modification of the device in accordance with the invention. 9 designates the thermal insulation of the oven, 10 is a heating element, 11 is the sagger, 12 is the object undergoing firing, 13 is the driving roller for rotating the sagger 11 with the object to be fired, and 14 is the frame and envelope of the oven.

Figure 6:
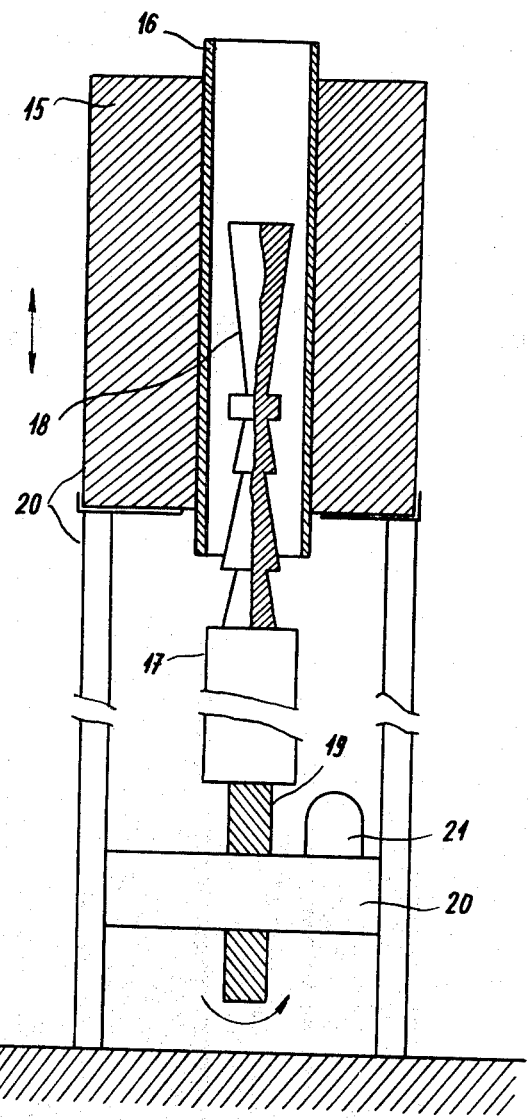
FIG. 6 shows a case where there is a shifting movement together with a rotary movement.

FIG. 6 illustrates an embodiment in which there is both a rotary and a sliding movement. 15 designates the thermal insulation of the oven, 16 is a heating element, 17 is a support for carrying the object 18 to be fired. The support 17 is connected with a screw 19. This screw rotates in a nut 20 and is connected with the device 21 to produce the rotation of the screw. It is clear that the objects to be fired perform both a shifting and a rotative movement.

The invention may be used for firing any type of axially symmetric ceramic objects of any shape and dimensions, more particularly long rods and tubes of any cross-section, for example, circular, regular polygonal, and the like.

An example of the use of the apparatus of the present invention is hereinafter set forth:

A steatite rod having a length of 2 m. and a diameter between 10–30 mm. is placed in the carrier which is then introduced into the tubular oven. The carrier is rotated constantly at a rate of between 1–6 rotations per minute, at an axial feed rate of 5–10 mm. per minute. The tubular oven is of a length of 50 cm. and its temperature is kept at approximately 1,350° C. The rod is suitably fired in a short period of time, as seen from its axial feed rate. The rod is uniformly heated on all surfaces giving it a high homogeneity and a high mechanical and electrical strength.

While it is preferable that the objects undergoing firing occupy a horizontal position as seen in FIGS. 1–5, they may be placed in a perpendicular position as seen in FIG. 6. In the position shown in FIG. 6 the weight of the object itself is usually sufficient to produce the desired axial pull and eventually any desired twist.

If desired the objects may be placed directly on the supporting base and may be covered with pieces of ceramic material which may be preheated. Preferably the objects are placed in the carrier freely so that they rotate about the medial axis of the apparatus and may rotate relative to the carrier space itself. As a result the objects are rotated and turned evenly about the heating oven and thus provide the aforementioned uniform heating and homogeneity.

The objects to be fired may be axially moved through the heating oven by moving the carrier or the objects themselves by any mechanical means such as the lead screw mechanism shown in FIG. 6, or by hand if desired. A suitable sagger device can be used to support the object if required. In addition when firing tubular articles an internal core provided with a heating element may be placed within the tubular object so that the object may be heated both from without and from within.

What we claim is:
1. An apparatus for firing ceramic objects comprising:
   (1) a longitudinally extending oven having a firing space and an inlet and outlet end spaced apart along the medial axis of said oven;
   (2) means for heating said oven;
   (3) a movable carrier mounted along the medial axis of said oven for directly supporting at least, a single ceramic object which has a longitudinal axis in a position parallel to the medial axis;
   (4) means for rotating said carrier and said object about said medial axis; and
   (5) means directly acting upon said object for forwardly moving said object from said inlet to said outlet end simultaneously with the rotation of said carrier.

2. The apparatus according to claim 1 wherein said carrier comprises a tubular member adapted to support said object inside thereof, said tubular member extending through said oven and said firing place and projecting beyond said oven and said inlet, and outlet ends, the means for moving the object comprise rod mean insertable axially within said tubular member independently of said carrier.

3. The apparatus according to claim 1 wherein said carrier comprises a thick walled cylinder having a plurality of apertures longitudinally extending symmetrically about and parallel to the central thereof each of said apertures serving to support at least one of said objects, rod means axially insertable within each of said apertures and means for mounting said rods being adapted for simultaneous rotation about the central axis of said tubular member and longitudinally movement through said apertures.

4. An apparatus for firing ceramic objects comprising an oven having a firing place and an inlet end,
   means for heating said oven,
   carrier means directly supporting said ceramic object,
   a stationary nut,
   a screw received in said nut and having an end connected to said carrier means,
   said nut, screw and carrier means being disposed outside of the oven so that by turning said screw said object is simultaneously rotated and longitudinally moved through said oven by one and the same means, and
   means for turning said screw.

References Cited

UNITED STATES PATENTS

| | | |
|---|---|---|
| 1,900,903 | 3/1933 | Bennington. |
| 1,962,635 | 6/1934 | Christman et al. |
| 2,577,935 | 12/1951 | Van De Pyl. |
| 2,629,131 | 2/1953 | Martin et al. |
| 3,210,449 | 10/1965 | Talalay et al. |
| 3,360,828 | 1/1968 | Behrens. |
| 3,110,075 | 11/1963 | Bossetti. |
| 3,328,861 | 7/1967 | Dressler. |
| 3,336,018 | 8/1967 | Cuvelier. |
| 3,230,596 | 1/1966 | Batigne _____ 25—132 |

J. HOWARD FLINT, Jr., Primary Examiner

U.S. Cl. X.R.

264—57